UNITED STATES PATENT OFFICE.

ENOS A. BRONSON, OF WYMORE, NEBRASKA.

FINISH FOR PLASTERING.

SPECIFICATION forming part of Letters Patent No. 499,710, dated June 20, 1893.

Application filed April 24, 1893. Serial No. 471,675. (No specimens.)

*To all whom it may concern:*

Be it known that I, ENOS A. BRONSON, a citizen of the United States, residing at Wymore, in the county of Gage and State of Nebraska, have invented a new and useful Finish for Plastering, of which the following is a specification.

My invention relates to a process for forming a ready-mixed finish for plastering, the objects in view being to provide a commercial article which may be prepared for application by the simple addition of water.

In carrying out my invention I employ a certain combination of materials which are united both chemically and mechanically by the use of heat, the resulting compound being subsequently ground and prepared for use.

I employ lime, gypsum, white sand, soapstone or "talc," and china clay or "kaolin" in about the following proportions: lime, one hundred and seventy pounds; gypsum, twenty pounds; white sand, twenty-five pounds; soapstone or "talc," twenty pounds; china clay or "kaolin," ten pounds. I add to this mixture sufficient water to thoroughly moisten and produce a soft, pasty or putty like mass, and subsequently add thereto a solution in hot water of alum and borax, the quantities of the last named materials proportionate to the first named materials being two pounds of alum and two pounds of borax. After thoroughly mixing the solution of alum and borax with the mixture, as described, I subject the mass to the action of intense heat thus producing a partial chemical combination, or a chemical combination of certain of the materials, important among which is the action of the borax and alum upon the lime. After the ingredients have been completely combined by the action of heat the material is suitably dried by any well known or approved process which, however, forms no part of my present invention, and subsequent to the drying operation the material is ground to the fineness of flour. To the resulting material, as above described, I then add a quantity of calcined gypsum, or plaster of paris, and white sand, in about the following proportions: calcined gypsum, or plaster of paris, two hundred and fifty pounds; white sand, twenty-five pounds. This completes the article, which is prepared for use by the admixture, in the ordinary manner, of a suitable quantity of water to produce the desired consistency, and it is applied to a wall in the same way as an ordinary putty or white coating.

From the above description it will be understood that the application of heat as a step in the process forms a very important feature of the invention in that by this means I may be enabled to produce a more intimate combination of the various ingredients than can be attained without this step.

I have not considered it necessary to give the chemical reaction resulting from the combination of the ingredients for the reason that the advantage attained by this chemical combination is not due merely to a new material formed, but to the fact that the ingredients are more intimately combined.

Having described my invention, what I claim is—

The process for forming a finish for plastering consisting of mixing lime, gypsum, white sand, soap-stone or "talc," and china clay or "kaolin" with sufficient water to form a pasty mass; then adding thereto a solution of alum and borax; then applying heat to produce an intimate combination of the ingredients; subsequently drying and grinding, and finally adding to the mass, calcined gypsum, or plaster of paris, and white sand, substantially as specified.

In testimony that I claim the foregoing as my own I have hereto affixed my signature in the presence of two witnesses.

ENOS A. BRONSON.

Witnesses:
J. C. BURCH,
JASPER BYERS.